United States Patent [19]

Lewiner et al.

[11] 4,401,891

[45] Aug. 30, 1983

[54] ELECTRET DEVICES FOR MEASURING IONIZING RADIATION

[76] Inventors: Jacques Lewiner, 5, rue Bory d'Arnex, 92210 Saint-Cloud; Gérard Dreyfus, Rue du Viaduc, Villebon s/Yvette, 91120 Palaiseau; Didier Perino, 10, rue de Bellevue, 92150 Suresnes, all of France

[21] Appl. No.: 226,760

[22] Filed: Jan. 21, 1981

[30] Foreign Application Priority Data

Feb. 11, 1980 [FR] France ............................ 80 02969

[51] Int. Cl.³ .............................................. G01T 1/18
[52] U.S. Cl. .................................... 250/374; 250/375
[58] Field of Search ............... 250/374, 375, 376, 377, 250/378, 388; 324/72, 109

[56] References Cited

U.S. PATENT DOCUMENTS 3,010,021 11/1961 Roesch et al. .................... 250/375
4,284,892 8/1981 Hulot et al. ...................... 250/376

*Primary Examiner*—Alfred E. Smith
*Assistant Examiner*—Janice A. Howell
*Attorney, Agent, or Firm*—Larson and Taylor

[57] ABSTRACT

The device comprises, on the one hand, a cassette containing an electret between two electrodes and, on the other hand, a fixed reader adapted to receive the cassette in a pocket, to identify it, to measure the charge of its electret and to display data relating to this charge. This reader comprises also a head adapted to record the data on an area (or strip) of the cassette and there are provided readers independent of the aforesaid reader adapted to subsequently receive the cassette, to measure the charge of its electret, to read the data and, by difference between the measured value and that read, to display the radiation dose received by the cassette since its recording.

10 Claims, 3 Drawing Figures

ELECTRET DEVICES FOR MEASURING IONIZING RADIATION

BACKGROUND OF THE INVENTION

The invention relates to electret devices for measuring ionizing radiations or at least for detecting the exceeding of a pre-determined threshold by the intensity of such a radiation or by the integrated dose of such radiation over a pre-determined period.

The devices concerned comprise an electret, that is to say a dielectric foil charged electrically at least in the vicinity of one of its two surfaces, two conducting electrodes arranged on both sides of this electret and electrically connectable together, means for keeping spaced from the electret one at least of the electrodes so as to form against this electret at least one ionising chamber sensitive to the radiation to be measured, and means for measuring the change of the electret, of which charge the variations are connected directly with the above radiation and hence enable the latter to be measured.

The invention relates more particularly, among measuring devices of the above-mentioned type, to those which are divided into two sub-assemblies, namely:
  on the one hand, an individual portable element comprising in the same compact box or "cassette" the electret, the two electrodes, their separating means and possibly electrical connection members,
  and on the other hand, a fixed "reader" comprising a pocket adapted to receive the cassette in a well-determined position, a source of electric current—which may be a simple connection to the mains—means for identifying the cassette, means for reading and measuring the charge of the electret contained in the cassette, means adapted to display data connected with the result of this measurement, and optionally electrical connection members adapted to cooperate in easily separable manner with those of the cassette.

By the expression "display of data" used above and in the following, must be understood both a display proper of this data, which can be perceived by the user (visual, audible . . . ) and an application of said data to exploitation means and notably recording means.

The above-described division of the measuring device into two sub-assemblies is very advantageous, in particular when the radioactive measurements carried out have the purpose of checking the overall doses of radiation received by several persons moving in enclosures or areas subject to radioactive contamination.

The division concerned enables, in fact, limitation to a very light cassette, of little and economical bulk of the portion, of the monitoring device, which is worn by each of these persons: it suffices to arrange the fixed reader in immediate proximity to the door giving access to the enclosure or area concerned, such a single reader—constituting an "entry" reader of the checking process and called below "entry reader"—sufficing to ensure the successive processing of a very large number of cassettes associated with different wearers.

The radiation dose received by the wearer of such cassette between his entrance into the enclosure and his exit from the latter—or more generally between the start and the end of a given monitoring period—may be calculated and displayed by the entry reader: it suffices for this apparatus to effect the difference between the values, of the charge of the electret contained in said cassette, measured respectively on the entrance of said wearer into the enclosure being checked and on the exit of this wearer from said enclosure.

However such a unit does not give satisfaction if the enclosure concerned is of large extent, as is frequently the case for nuclear installations, considering that the frequent consultation of the entry reader cannot be contemplated for persons too distant from this apparatus.

One remedy for this drawback consists of multiplying, within the enclosure, the number of fixed readers of the entry reader type, but then it would be necessary, on the one hand, to choose for these apparatuses very sophisticated models, and on the other hand, to interconnect these apparatuses considering that the data relating to the identification of the cassettes and to the entry charges of their electrets must be available at any moment on each of these apparatus: such a formula is hence very burdensome and very delicate to place in operation.

It is an object of the invention to overcome these drawbacks in a particularly efficient and economic manner.

GENERAL DESCRIPTION OF THE INVENTION

The measuring devices of the above type according to the invention are for this purpose essentially characterised in that they comprise, in addition to at least one cassette of the type indicated and at least one entry reader of the type also indicated, at least one auxiliary reader and in that these different sub-assemblies are arranged so that the initial introduction of each cassette into an entry reader has the effect of automatically ensuring, not only the measurement of the charge of the electret contained in this cassette at this moment, but also the recording on said cassette of data relative to this charge, and that the subsequent introduction of the cassette into an auxiliary reader has the effect of automatically ensuring, not only the measurement of the new charge of the electret at this new moment, but also the reading of the data recorded relating to the initial charge, as well as the display of data connected with the difference between these two charges, notably of the radiation dose received by the cassette between the two introductions concerned.

To this end:
  each cassette comprises means adapted to receive automatically the recording of data relating to the charge of its electret when it is inserted initially into an entry reader and to present the data recorded so that it can be read automatically on its insertion into an auxiliary reader,
  each entry reader comprises, in addition to means adapted to measure the momentary charge of the electret contained in each cassette which is inserted therein, means adapted to generate the above data and to record it on said inserted cassette,
  and each auxiliary reader comprises, in addition to means adapted to measure the momentary charge of the electret contained in each cassette which is inserted therein, means adapted to read the data previously recorded on this cassette and means adapted to calculate and to display data connected with the difference between the two charges successively measured of the electret, data such as the radiation dose received by the cassette between the moments of the two measurements.

The invention is of course directed, not only to complete installations with cassettes and readers such as defined above, but also, individually, to the special cassettes and readers which compose them.

In preferred embodiments, recourse is had in addition to one and/or other of the following features:

- each entry reader is arranged so as to be able to serve equally as an exit reader, that is to say to be able to display, on the exit of the wearer of a cassette from the enclosure, the total dose of radiation received by this wearer since his entrance into this enclosure,
- in a device according to the preceding paragraph, the entry reader includes in addition, on the one hand, means for servo-coupling to the initial reception of a cassette by this reader of a simultaneous memorisation of the identification of this cassette and of the charge of the electret contained in the latter measured at the moment of this initial reception and, on the other hand, means for servo-coupling to the following reception of the same cassette by said reader, not only a new identification of this cassette and a new measurement of the charge of the electret at the moment of this other reception, but also the reading of the value memorised of said charge, the calculation of the difference beween the two charge values thus respectively measured and read, and the display of this difference or of a parameter connected with the latter, such as notably the corresponding radiation dose,
- the entry reader according to at least the last paragraph but one includes in addition means for automatically erasing from the cassette the data recorded in it on its second reception in the entry reader,
- the device comprises a plurality of auxiliary readers independent of one another,
- the means provided on the cassette to receive the recording indicated are of a magnetic type and have the form of a magnetic track, the recording means and read-out means of the corresponding data then being magnetic heads,
- the means provided on the cassette for receiving the recording indicated are of an electronic type and are connected to a multiple contact connector,
- the means provided on the cassette to receive the recording indicated are of an electronic type and means are provided for transmitting by magnetic or electric induction (capacitative connection) the data to be recorded from the entry reader to the cassette,
- each cassette comprises an openable face adapted to be opened and oriented so that, on the insertion of this cassette into the reader, this insertion automatically ensures the positioning, through said open face, of means for measuring the charge of the electret, means comprised by the reader,
- in a cassette according to the preceding paragraph, a protective flap is provided to obturate in sealed manner the openable face of the cassette outside of the moments of measurement and possibly short-circuit at the same time its two electrodes.

The invention comprises, apart from these main features, certain other features which are preferably used at the same time and which will be more explicitly considered below.

In the following, some preferred embodiments of the invention will be described with reference to the accompanying drawings to be regarded, of course, as in no way limiting.

DESCRIPTION OF PREFERRED EMBODIMENTS

Figure 1:
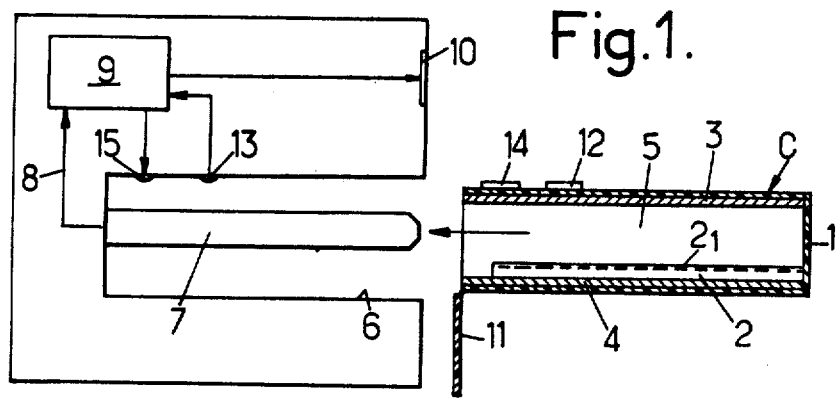
FIG. 1, of this drawing, shows diagrammatically an electret cassette presented at the entry of a receiving pocket of this cassette by an entry reader, said cassette and said reader being constructed according to the invention.

The cassette C comprises a casing 1 notably exhibiting the shape of a flat rectangular parallelepiped, notably of plastics material, itself containing:

- an electret 2 electrically charged in the vicinity of at least one of its surfaces $2_1$, as shown symbolically by the signs—although the charge concerned may be positive as well as negative,
- and two electrodes 3 and 4 constituted by plates conducting electricity parallel with each other and with the electret, one 3 of these plates being held at a certain distance from the charged surface $2_1$ of the electret by the side walls of the cassette so as to preserve, between this plate and this face, an ionisation chamber 5.

The other electrode 4 can be in contact with the electret, as shown, but this is not indispensable.

As known the charge of the electret 2 varies progressively according to the ambient radioactivity due to the fact that the reception of ionising radiation (gamma rays, X rays, neutrons) by the chamber 5 is manifested, either by the direct progressive discharge of this electret, or by the creation of ions in the vicinity of said electret, which gradually cover its face $2_1$ with an ionic layer tending to neutralise the charge of this face.

The variations of this charge of the electret are all the more rapid as the intensity of the radiation concerned is greater: the measurement of these charge variations hence enables said intensity to be known.

This measurement is effected, as well as the corresponding exploitation calculations, not in the cassette itself, but in a fixed reader A comprising a pocket 6 adapted to receive the cassette in a well-determined position.

This reader comprises means 7, 8 for measuring the charge of the electret which automatically come into cooperation with the latter on said reception of the cassette in the pocket 6 and an exploitation unit 9 connected to these measuring means.

Said measuring means may be constituted in any desirable manner.

For example, they may be arranged so as, on the one hand, to establish an electrical contact between the electodes 3, 4 borne by the cassette and two feelers comprised by the reader and on the other hand, to insert a conductive flap borne by said reader between the electret 2 and at least one electrode, e.g., electrode 3, of the electrodes of the cassette, in accordance with teachings of French patent application No. 79 10225 filed by applicants 23 Apr. 1979.

Or again the measuring means concerned are arranged so as on the one hand, to apply to an electrode influenced by the electret a voltage adapted to cancel the electrical field created by this electret in the vicinity of this electrode and, on the other hand, to measure this cancelling voltage.

According to still another modification, the measuring means concerned are arranged so as to cause the vibration of at least one electrode influenced by the electret and to measure the variation in charge or in voltage induced on this electrode by said vibration.

The unit 9 is arranged so as to develop data E connected with the charge of the electret 2 at the moment concerned, which data is displayed on a screen 10 and preferably in addition memorised.

When the cassette C is in its resting or watching condition, that is to say, outside of the periods of measurement proper, the two electrodes 3 and 4 are connected together electrically, for example by means of a conducting element housed in a pivoting flap 11 constituting a small face of the cassette in its closed position: in this closed position, this flap serves not only to connect the electrodes 3 and 4, but also to protect the inner space of the cassette from impurities by isolating this space from the outside in sealed manner, which renders possible the maintenance of a constant gas pressure inside the cassette, independently of the ambient pressure. Said flap 11 is opened (FIG. 1) on the introduction of the cassette into the pocket 6 for measuring purposes, which here disconnects the electrodes.

The cassette includes means of any desirable nature enabling its identification by the reader A: these means are advantageously constituted by an area 12 carrying magnetic data adapted to be read by a magnetic head 13 of the reader and then memorised in a suitable circuit of the unit 9 preferably in association with the data E above.

In addition, the cassette comprises means adapted to receive automatically, when it is inserted into the pocket 6, the recording of data F connected with the data E above regarding the charge of its electret; these two data E and F can be identical.

These means are advantageously constituted by a magnetic area 14 borne by the cassette and adapted to be placed exactly opposite a magnetic recording head 15 of the reader A when it is inserted fully into the pocket 6, or to pass by opposite this head 15 on its to-and-fro movement of insertion into this pocket and extraction from the latter.

The head 15 is itself energised by circuits, of the unit 9, selected so as to put the data F in its form recordable by this head 15 on the area 14.

The recording concerned could be carried out in any other desirable manner, for example on an electronic memory provided in the cassette, the insertion of the latter in the pocket 6 then having effect of automatically establishing a multiterminal electrical contact between this memory and the circuit, of the unit 9, provided to develop the analog or numeric electrical data F, to be inserted into said memory.

The transmission of the electrical data F from the unit 9 to the cassette C may also be assured without establishment of direct electrical contact, notably when this data is in a binary form, said transmission then being effectable:

by a capacitative route, two electrodes designed to constitute a same condenser then being provided respectively on the reader A and on the cassette C and being arranged automatically parallel to one another, when the casssette is fully inserted into the pocket 6, or again by magnetic induction, two electrical windings then being provided respectively on the reader A and on the cassette C at places such that they are automatically at adjacent and coaxial positions when the cassette is positioned in the pocket 6.

The magnetic recording has the important advantage of requiring no source of electrical current to the cassette, no more than the electret itself.

For the other solutions, there would be adopted on the cassette electronic circuits with very low electrical consumption such as C-MOS circuits.

For the wearer of a cassette thus itself carrying data F relating to the initial condition of charging of its electret, it is unecessary to be presented again before the reader A to know the development over time of the radiation dose received: it is sufficient for this purpose to introduce said cassette into an auxiliary reader B which is much simpler than the reader A and which will now be described with reference to FIG. 2.

Such a reader comprises, like the reader A, a pocket 6' adapted to receive the cassette in a well-determined position, measuring means 7', 8' connected to an exploitation unit 9' and a display screen 10'.

But here there are no longer to be found identification means comparable with the preceding head 13 and with the means associated with the latter, and the preceding recording head or the like 15 is here replaced by a reading head or the like 16 adapted to "read" the data F previously recorded on each cassette C.

This reading is of course adapted to the manner in which the data to be read has been recorded on the cassette: in particular, if it relates to data stored in an electronic memory of which the contents is releasable only on order, the unit 9' may be arranged so as to give this memory the order to trigger the process of transmission of the stored data.

In addition, the unit 9' is arranged so as to effect the difference between the values of the two data that it receives respectively from the head 16 and from the measuring means 7', 8' and which correspond respectively to the initial charge and to the existing charge of the electret. In addition, this unit 9' is arranged so as to display on the screen 10' the difference thus calculated or data connected with this difference such as the total dose of radiation received by the cassette between the two charge measurements.

It is to be noted that it is entirely unecessary to interconnect the auxiliary reader B with the entry reader A.

Figure 3:
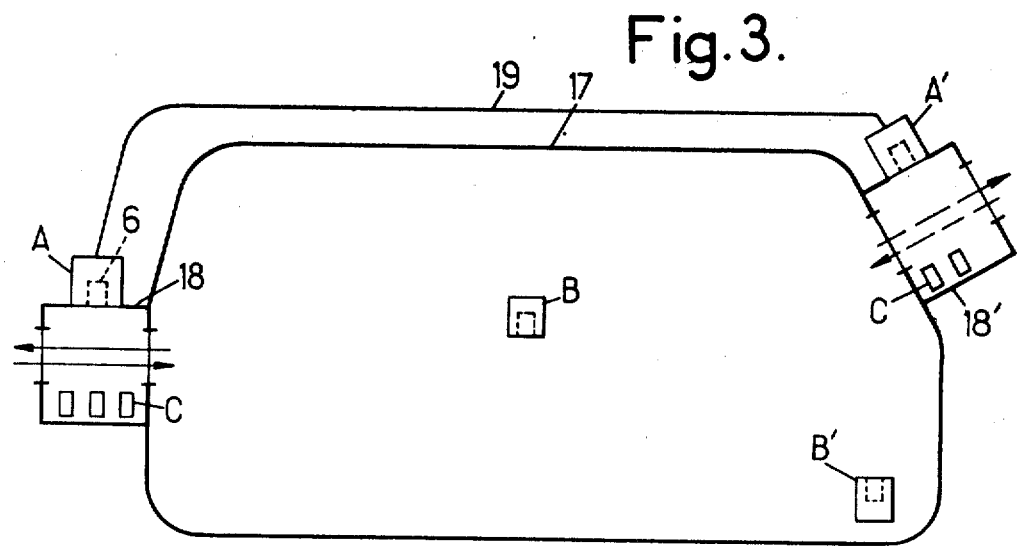
FIG. 3 is the general diagram of an installation equipped with cassettes and readers according to the invention.

It is hence possible to arrange, under particularly simple and economic conditions, a plurality of such auxiliary readers B, B' . . . within the enclosure to be controled, as has been shown diagrammatically in FIG. 3 where said enclosure has been denoted by the reference 17.

In this FIG. 3, the two entry locks to the enclosure are denoted respectively by 18, 18'.

The lock 18, equipped with an entry reader A, is, for example, provided for the normal entrances and exits of personnel in the enclosure 17 and the lock 18' is an annexe or emergency entrance or exit access also equipped with a reader A' of the reader A type and which can provide exactly the same services as the latter due to the fact that it is interconnected with the latter through a cable 19.

Of course, it is advantageous for each entry reader A, A' to be able itself to serve as an exit reader, that is to say able to display the radiation dose received by a person between, on the one hand, his entrance into the enclosure 17 through the corresponding lock 18, in the course of which entrance he takes up a cassette C at a rack placed in said lock, then introduces its cassette into the pocket 6 of the corresponding reader A and, on the other hand, his exit from said enclosure 17 through said lock 18, in the course of which exit he reintroduces its cassette into the above pocket 6 before replacing it on the rack, and this independently of the intermediate controls carried out between these two moments of entrance and exit by means of auxiliary readers B.

In particular, it is convenient that the simple second insertion of the same cassette C into the pocket 6 should automatically ensure the desired dose display.

To this end, the reader A is preferably arranged so that any "second reception" of a cassette results in the display concerned.

Such a result assumes:
  that the "first reception" of the cassette by the reader A has given rise not only to the identification of this cassette and to the measurement of the charge of its electret, but also to the memorisation of these two data,
  and that the "second reception" should then automatically give rise, not only to a second identification of the cassette and to a second measurement of the charge of its electret, but also to the reading of the two above data, then to the comparison between the two successively measured values (namely that memorised and that measured the second time) and finally in the display of the result of this comparison.

Figure 2:
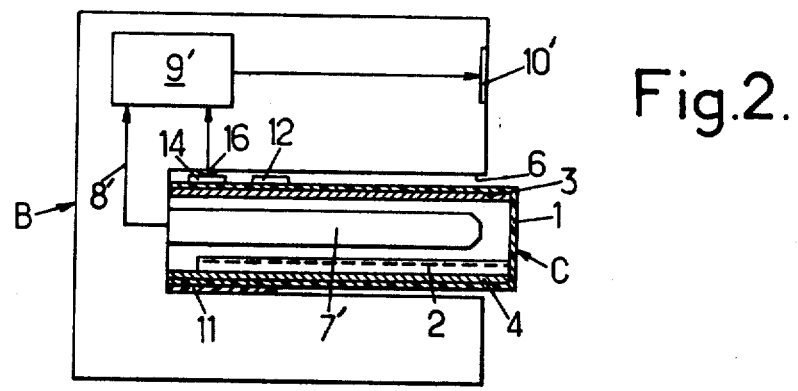
FIG. 2 shows diagrammatically the preceding cassette fully inserted into the receiving pocket comprised by an auxiliary reader according to the invention.

In a modification, it would be possible to provide for the memorisation of the first data relating to the charge of the electret to be ensured only on the cassette C and not on the reader A, each reader A then being arranged at the same time in the two ways described with regard to FIGS. 1 and 2 above so as to ensure, on each first reception of the cassette, the desired recording on this cassette and, on each second reception of a cassette, the reading of said recording. To this end, the identification of a "second reception" would have the result of converting the function of the member (15 or 16), of the reader, which is called upon to cooperate with the cassette from its recording function to its read-out function and this would be the reverse for each "first reception".

It would also be possible to envisage providing on the cassette several distinct members respectively associated with the reception of data from the reader and with the restitution of data to this reader, each of these members being separately activatable on insertions of the cassette into the different readers.

It would also be possible to envisage that the reading indicated of the recording of the cassette should have the effect of erasing this recording, to guarantee that the data recorded on a cassette correspond always to a true "first reception" of the latter in a reader A and not to a prior processing.

As a result of which, and whatever the embodiment adopted, there is finally provided an electret cassette radiometry installation whose constitution and operation result sufficiently from the foregoing.

This installation has a certain number of advantages with respect to those previously known, notably that of being able to multiply simply and economically the stations for reading the contents of these cassettes without substantially increasing the weights, the dimensions and prices of the latter, which must simply be adapted to receive automatically data relating to the charge of their electrets at given initial moments.

As itself evident, and as emerges already from the foregoing, the invention is in no way limited to those of its types of application and embodiments which have been more especially contemplated; it encompasses, on the contrary, all modifications, notably:
  those wherein the identification means of the cassette would be completed by identification means of the wearer of this cassette, said means calling if necessary upon supporting data independant of said cassette, such as a magnetic card, said additional identification enabling, if necessary, the history of said wearer from the point of view of reception of the doses of radiation, to be taken into account,
  those where the supporting data relating to the charge of the electret would be still borne by the cassette, but indirectly, through an element fixed on this cassette, optionally removable.

We claim:
1. Measuring device for ionizing radiation comprising, at least one cassette containing an electret disposed between two electrodes which are separated from one another so as to provide between the electret and one electrode an ionizing chamber sensitive to the radiation to be measured and at least one "entry" reader comprising a pocket for receiving the cassette in a predetermined position therein, a source of electrical current, means for identifying the cassette, means for reading and measuring the charge of the electret contained in the cassette and means for displaying data related to the result of said measurement, said device comprising in addition at least one auxiliary reader, each cassette comprising means for automatically receiving the recording of data relating to the charge of the electret thereof when the cassette is initially inserted into the entry reader and to present the recorded data so that this data can be read automatically upon the insertion of the cassette into an auxiliary reader, each entry reader comprising, in addition to means for measuring the momentary charge of the electret contained in each cassette which is introduced therein, means for processing the said data and for recording said data on said inserted cassette, and each auxiliary reader comprising, in addition to means for measuring the momentary charge of the electret contained in each cassette which is inserted therein, means for reading the data previously recorded on this cassette and means for calculating and displaying data connected with the difference between two successively measured charges of the electret.

2. Measuring device according to claim 1, wherein the entry reader also comprises means for providing, responsive to the initial reception of a cassette by this reader, simultaneous storage of the identification of said cassette and of the charge of the electret contained in the cassette as measured at the moment of this initial reception and means, responsive to the following reception of the same cassette by said reader, for not only providing a new identification of this cassette and a new measurement of the charge on the electret thereof, but also providing reading of the stored value of said charge, calculation of the difference between the two charge values thus respectively measured and read, and display of a parameter related to said calculation.

3. Device according to claim 1, wherein the entry reader also comprises means for automatically erasing from the cassette data recorded therein upon the second reception of the cassette in this entry reader.

4. Device according to claim 2, wherein the entry reader also comprises means for automatically erasing from the cassette the data recorded therein upon the second reception of the cassette in this entry reader.

5. Measuring device according to claim 1, comprising a plurality of independent auxiliary readers.

6. Measuring device according to claim 1, wherein the means provided on the cassette for receiving the recording is of a magnetic type in the form of a magnetic track, the recording and read-out means for the corresponding data being magnetic heads.

7. Measuring device according to claim 1, wherein the means provided on the cassette for receiving the recording is of an electronic type connected to a multiple contact connector.

8. Measuring device according to claim 1, wherein the means provided on the cassette for receiving the recording is of an electronic type and wherein means are provided for transmitting by magnetic or electric induction the data to be recorded from the entry reader to the cassette.

9. Measuring device according to claim 1, wherein each cassette comprises an openable face oriented so that, on the insertion of the cassette into a reader, this insertion automatically ensures the predetermined positioning through said open face of measuring means associated with the reader for measuring the charge of the electret.

10. Measuring device according to claim 9, wherein a protective flap is provided to close in a sealed manner the openable face of the cassette when said measurement is carried out.

* * * * *